(12) United States Patent
Quinn

(10) Patent No.: US 7,945,921 B2
(45) Date of Patent: May 17, 2011

(54) CROSS APPLICATION DOMAIN LATE BINDING TO NON-LOCAL TYPES

(75) Inventor: Thomas E. Quinn, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1111 days.

(21) Appl. No.: 11/681,159

(22) Filed: Mar. 1, 2007

(65) Prior Publication Data

US 2008/0216102 A1    Sep. 4, 2008

(51) Int. Cl.
- *G06F 3/00* (2006.01)
- *G06F 15/16* (2006.01)
- *G06F 9/45* (2006.01)

(52) U.S. Cl. ........ 719/332; 719/330; 719/315; 709/227; 709/330; 717/136

(58) Field of Classification Search .................. None
See application file for complete search history.

(56) References Cited

U.S. PATENT DOCUMENTS

| | | | |
|---|---|---|---|
| 6,141,696 A | 10/2000 | Goertzel et al. | |
| 6,401,099 B1 | 6/2002 | Koppolu et al. | |
| 6,728,788 B1 | 4/2004 | Ainsworth et al. | |
| 7,017,162 B2 | 3/2006 | Smith et al. | |
| 7,100,153 B1 | 8/2006 | Ringseth et al. | |
| 2002/0120793 A1* | 8/2002 | Guthrie et al. | 709/330 |
| 2003/0131347 A1 | 7/2003 | Allison | |
| 2005/0216594 A1* | 9/2005 | O'Brien et al. | 709/227 |
| 2005/0226406 A1 | 10/2005 | Forin et al. | |
| 2005/0268309 A1* | 12/2005 | Krishnaswamy et al. | 719/330 |
| 2006/0206884 A1 | 9/2006 | Creamer et al. | |
| 2006/0218446 A1 | 9/2006 | Crawford | |
| 2006/0294494 A1 | 12/2006 | Quinn | |

OTHER PUBLICATIONS

Fjeld, Frode V., "The Movitz development platform," May 27, 2004.
Gibeling, Greg et al., "The RAMP Architecture & Description Language," http://ramp.eecs.berkeley.edu/Publications/RAMP%20Documentation.pdf, [last accessed Apr. 23, 2007.
Joncheere, Niels, "Principles of Object-Oriented Languages: Smalltalk vs. Objective Caml," Jan. 27, 2003.
Obermeyer, Piet and Jonathan Hawkins, "Microsoft .NET Remoting: A Technical Overview," Jul. 2001, http.//msdn2.microsoft.com/en-us/library/ms973857(d=printer).aspx, [last accessed Apr. 23, 2007}.
Tourwe, Tom and De Meuter, Wolfgang, "An Open Compiler using Meta-Level Information for Improving the Efficiency of Object-Oriented Systems," http://homepages.cwi.nl/~tourwe/articles/oopsla1998-ReflectionWS.pdf, [last accessed Apr. 23. 2007].

* cited by examiner

*Primary Examiner* — Andy Ho
*Assistant Examiner* — Tuan Dao
(74) *Attorney, Agent, or Firm* — Perkins Coie LLP

(57) ABSTRACT

A system allows a non-virtual method of a base class inherited by a derived class to be effectively overridden so that code developed to access the method via the base class accesses the overriding behavior. The system replaces an instance of the derived class with a dynamic object and transparent object with the transparent object appearing to provide to invoking code an implementation of the derived class. Upon receiving an invocation of a method, the transparent proxy directs the invocation to the dynamic object by invoking an invoke method of the dynamic object passing an indication of the invoked method of the transparent object. The dynamic object may be an instance of a dynamic class that inherits a real class with a virtual invoke method. The dynamic class overrides the invoke method to provide overriding behavior.

15 Claims, 4 Drawing Sheets

CROSS APPLICATION DOMAIN LATE BINDING TO NON-LOCAL TYPES

BACKGROUND

Developers of many application programs ("applications") implement the applications so that they can be customized by third parties. To customize an application, a third party develops custom code (e.g., add-ins and document-level customizations) that uses functionality exposed by the application. The custom code may improve the usability of the applications or provide additional functionality (e.g., domain-specific functionality). Such applications are referred to as "host applications" because the custom code is hosted within the process of the application. Developers of applications typically want to encourage the development of custom code for their applications to increase the demand for their applications. As a result, such developers may provide "custom code runtimes" that facilitate the development of custom code. A runtime is code that is loaded along with custom code and provides services to the custom code. These services may include higher-level functionality than that exposed by the application or may include domain-specific functionality. When an application is to load and start the execution of custom code, the application may load the runtime and direct the runtime to load and start the execution of the custom code.

Because of the ease of developing custom code as "managed code," many applications support the execution of custom code in the .NET Framework provided by Microsoft Corporation. The .NET Framework provides a common language runtime ("CLR") that provides high-level operating system type services to the managed programs (including custom code and applications) and serves as an execution engine for managed programs. The CLR ensures that managed programs do not take any unauthorized action. As such, the CLR acts as a "sandbox" within which managed programs execute. The CLR provides application domains ("appdomains") in which different managed programs can execute to help ensure that an errant managed program will not unduly affect the execution of another managed program.

In some environments, both host applications and custom code execute as managed code. A developer of a host application that executes as managed code defines objects (e.g., adhering to the Component Object Model of Microsoft Corporation) that are exposed to the custom code. Because the developer of a host application and the developers of custom code for the host application typically have different product release cycles, the current versions of their products may not be compatible when the custom code is statically bound (e.g., at compile time) to an exposed object. In such a case, when the developer changes the type of an exposed object in a new version of the host application, the current version of the custom code, which was developed based on the old type, may be incompatible with the new type. To address this incompatibility, a Managed Add-in Framework ("MAF") has been developed that allows custom code to dynamically bind (e.g., at runtime) to exposed objects of a host application that executes as managed code. An embodiment of MAF is described in U.S. application Ser. No. 11/167,728, entitled "Managed Automation Programming Model" and filed on Jun. 27, 2005, now U.S. Pat. No. 7,523,444 issued Apr. 21, 2009.

FIG. 1 is a block diagram that illustrates remote access of a server object by client code. A server object is any object exposed by an application domain for access by client code executing in a different application domain. For example, a host application may expose a server object for use by custom code that executes in a different application domain. A server application domain 110 includes a server object 111 and a type object 112. The server object is exposed so that it can be accessed by client code executing in a client application domain. To enable remote access across application domains, the server class inherits the object class and the marshal by reference object class. The marshal by reference object class provides the functionality that supports remote access in the .NET Framework. A client application domain 120 includes a real proxy object 121, a transparent proxy object 122, client code 123, and a type object 124. The real proxy object is provided by the remote access functionality, and the transparent proxy object is provided by the real proxy object. The transparent proxy object is an object that looks to the client code as if it were an actual instance of the server object. Thus, the client code can invoke methods of the transparent proxy object just as it would invoke methods of an actual instance of the server object. When the transparent proxy object receives an invocation of a method by the client code, it forwards to the real proxy object an invocation request that includes the identifier of the server object, an identifier of the method to be invoked, and any actual parameters. The real proxy object forwards the invocation request to the identified server object. Upon receiving the invocation request, the marshal by reference object functionality of the server object invokes the method passing the actual parameters. When the method completes, any returned parameters are passed to the real proxy object, which provides them to the transparent proxy object for returning to the client code.

This remote access of objects works well in static binding situations but has some difficulties in dynamic binding situations. The object class provides general functionality to all objects including support for dynamic binding via "reflection." To support dynamic binding, the object class provides a get type method that provides a reference to a type object that provides type information (e.g., method names and formal parameters) for the type of an object that inherits the object class. Once code has a reference to a type object for the class of an object, the code can invoke methods of the type object to retrieve the type information for that object. When the code wants to invoke a method of the object dynamically, it can invoke an invoke method of the type object passing a reference to the object, an identifier of a method, and any actual parameters. The invoke method of the type object then calls the corresponding method of the object passing the parameters and then returns any out parameters.

When client code executes in a separate application domain from a server object, the client code needs to instantiate in its application domain a type object for the class of the server object to enable dynamic binding. If the client application domain has access to the type information of the server class, then the client code can dynamically bind to the server object. For various reasons, however, it may not be desirable to allow client code to have access to such type information. Access to the type information of a server object may confer access to other server code, which may not be desired. Also, it can be administratively difficult to ensure that all client code has proper access to all the type information of all the server objects it needs to access.

If client code does not have access to type information of the server object, then the transparent proxy object will instantiate a type object for the closest parent class for which type information is available. For example, when the type information for the server object is not available, the transparent proxy object will instantiate a type object for the marshal by reference object class. When the client object tries to dynamically bind to the server object, an error will occur because the type object has no type information for the server object.

FIG. 2 is a block diagram that illustrates a solution that overcomes the problem of not having access to the type information of a server object. A server application domain 210 includes a server object 211, a type object 212, a remote object adapter object 213, and a remote type adapter object 214. A client application domain 220 includes a real proxy object 221, a transparent proxy object 222, client code 223, a remote type object 224, a real proxy object 225, a transparent proxy object 226, and a remote object 227. The server object 211 and type object 212 function in the same way as server object 111 and type object 112 (FIG. 1), except that the server object does not need to inherit the marshal by reference object class. The remote object adapter object exposes an IRemoteObjectContract interface that allows the client code to invoke the methods of the server object. When the remote object adapter object receives an invocation request for the server object, it invokes the corresponding method of the server object and returns any out parameters to the client code via the remote object. When the client code invokes the get type method of the remote object, the remote object sends an invocation request to the remote object adapter object. The remote object adapter object invokes the get type method of the server object, which causes the type object for the server class to be instantiated. Upon receiving a reference to the type object, the remote object adapter object instantiates the remote type adapter object and provides the reference to the type object. The remote type adapter object inherits the object class and the marshal by reference object class so that the client application domain can access the remote type adapter object remotely. The remote type adapter object exposes an IRemoteTypeContract interface through which the remote type object of the client application domain can access the type information of the type object for the server class. The remote type object of the client application domain inherits the type class so that it provides a type interface to the client code. The remote object adapter object returns a reference to the IRemoteTypeContract interface to the remote object, which instantiates the remote type object providing a reference to the remote type adapter object. The remote type object sets up a communications link to the remote type adapter object. The remote object then returns a reference to the remote type object to the client code.

To dynamically bind to the server object, the client code invokes get type information methods of the remote type object. The remote type object forwards an invocation request to the remote type adapter object, which in turn invokes the corresponding method of the type object for the server class. The out parameters are forwarded from the remote type adapter object to the remote type object, which returns the parameters to the client code. When the client code invokes the invoke method of the remote type object, the invocation request is sent to the remote type adapter object, which invokes the invoke method of the type object of the server class. The type object then invokes the corresponding method of the server object and returns any out parameters to the remote type adapter object, which forwards them to the remote type object for returning to the client code. Thus, the client code can access the type information for the server object even though it does not have direct access to the type information within its application domain.

A problem with the use of a remote object that inherits the object class is that the get type method of the object class is not a virtual method. As such, the remote object cannot override the get type method of the object class. So, in order for the client object to invoke the get type method of the remote object, it needs to be developed to specifically invoke the get type method of the remote object. As such, existing client code that invokes the get type method of the object class will not work correctly in this environment.

SUMMARY

A method and system for late binding of objects across application domains is provided. A system allows a non-virtual method of a base class inherited by a derived class to be effectively overridden so that code developed to access the method via the base class accesses the overriding behavior or functionality. The system replaces an instance of the derived class with a dynamic object and transparent object with the transparent object appearing to provide to invoking code an implementation of the derived class. Upon receiving an invocation of a method, the transparent proxy directs the invocation to the dynamic object by invoking an invoke method of the dynamic object passing an indication of the invoked method of the transparent object. The dynamic object may be an instance of a dynamic class that inherits a real class with a virtual invoke method. The dynamic class overrides the invoke method to provide overriding behavior.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for late binding of objects across application domains is provided. In one embodiment, a system allows a non-virtual method of a base class inherited by a derived class to be effectively overridden so that code developed to access the method via the base class accesses the overriding behavior or functionality. The system replaces an instance of the derived class with a dynamic object and transparent object with the transparent object appearing to provide to invoking code an implementation of the derived class. For example, the dynamic object and the real object may be based on a real proxy and a transparent proxy of the .NET Framework. Upon receiving an invocation of a method, the transparent proxy directs the invocation to the dynamic object by invoking an invoke method of the dynamic object passing an indication of the invoked method of the transparent object. The invoke method generally dispatches an invocation to the appropriate method. The dynamic object may be an instance of a dynamic class that inherits a real class with a virtual invoke method. The dynamic class overrides the invoke method to provide overriding behavior. When the invoke method is to dispatch a method with overriding functionality, it can directly perform that functionality or invoke a method that performs that functionality. The invoke method intercepts an invocation and effectively overrides the functionality of the non-virtual method. Because the invoke method of the real class is virtual, the invoke method of the dynamic class is invoked when called via the dynamic object when the dynamic object is cast to a real object.

The late binding system allows the behavior of the non-virtual get type method of a remote object that is inherited from an object class to be effectively overridden by replacing the remote object with a dynamic proxy object and a transparent proxy object. A dynamic proxy class inherits a real proxy class that provides a virtual invoke method. The dynamic proxy class provides an overriding implementation of the virtual invoke method that checks for invocation of the get type method. When the invoke method detects the invocation of the get type method, it returns a remote type object, rather than a more generic type object that would have been returned by the non-virtual get type method of the object class. In this way, client code written to access the get type method of the object class will receive the remote type object that has the type information for a server object in a different application domain.

Figure 3:
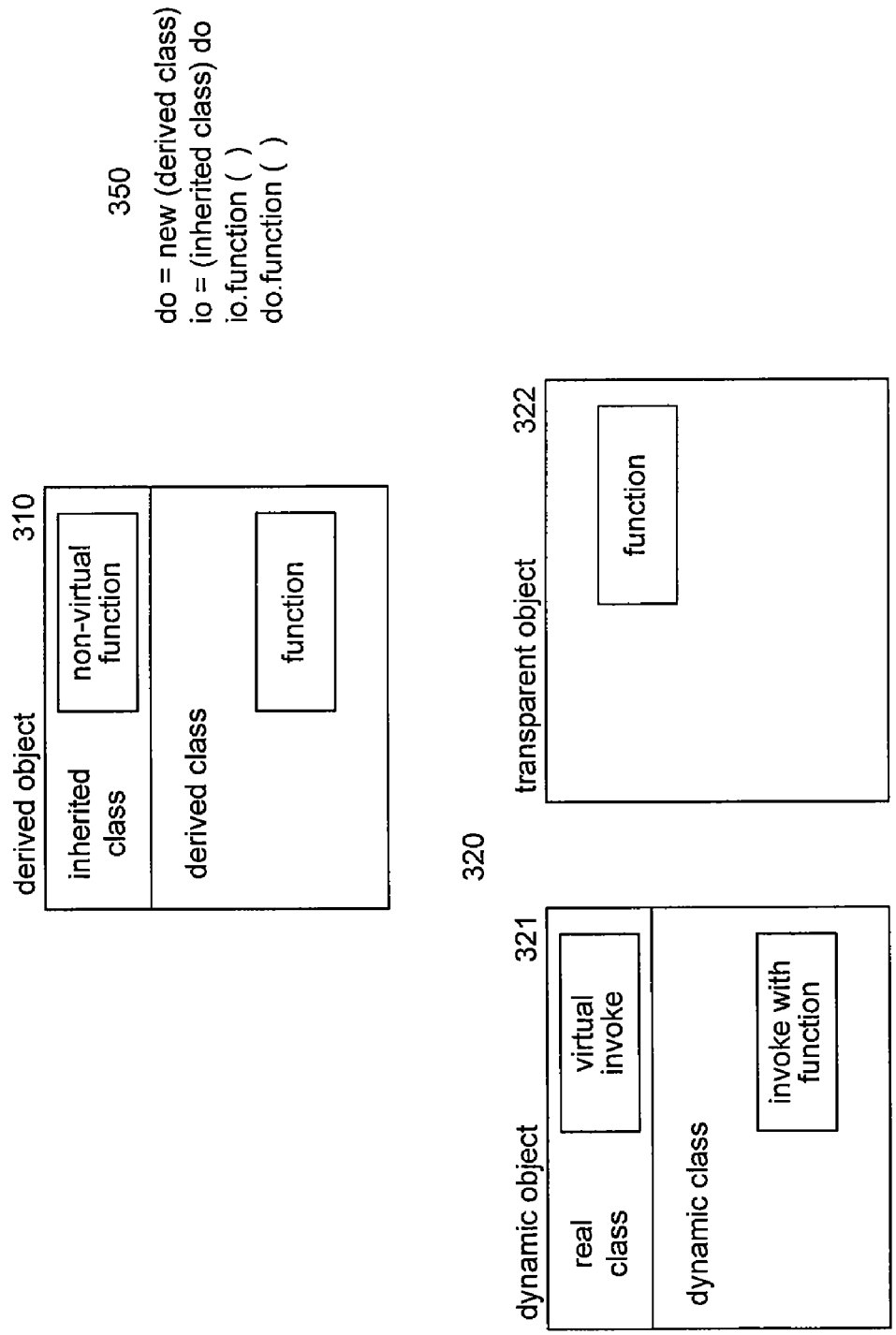
FIG. 3 is a block diagram that illustrates a derived object with a non-virtual method and dynamic object and transparent object that effectively overrides the behavior of the non-virtual method.

FIG. 3 is a block diagram that illustrates a derived object with a non-virtual method and dynamic object and transparent object that effectively overrides the behavior of the non-virtual method. A derived object 310 inherits a class that provides a non-virtual method called "function." The derived class inherits the base class and provides an implementation of the function. However, since the function is non-virtual, the implementation in the derived class will not override the behavior of the function in the base class. Thus, when the function is invoked via the base class, the implementation of the base class is invoked. When the function is invoked via the derived class, the implementation of the derived class is invoked. In code 350, the statement io.function( ) will have a different behavior than the statement do.function( ). Solution 320 includes dynamic a object 321 and a transparent object 322. The transparent object provides an implementation of the function that invokes the invoke method of the dynamic object. Since the dynamic class inherits the real class with a virtual invoke method, the dynamic class can override the invoke method. When the transparent object invokes the invoke method via the dynamic object cast to a real object, the invoke method of the dynamic class is invoked, which provides the overriding behavior. In code 350, the statement io.function( ) will have the same behavior as the statement do.function( ).

Figure 1:
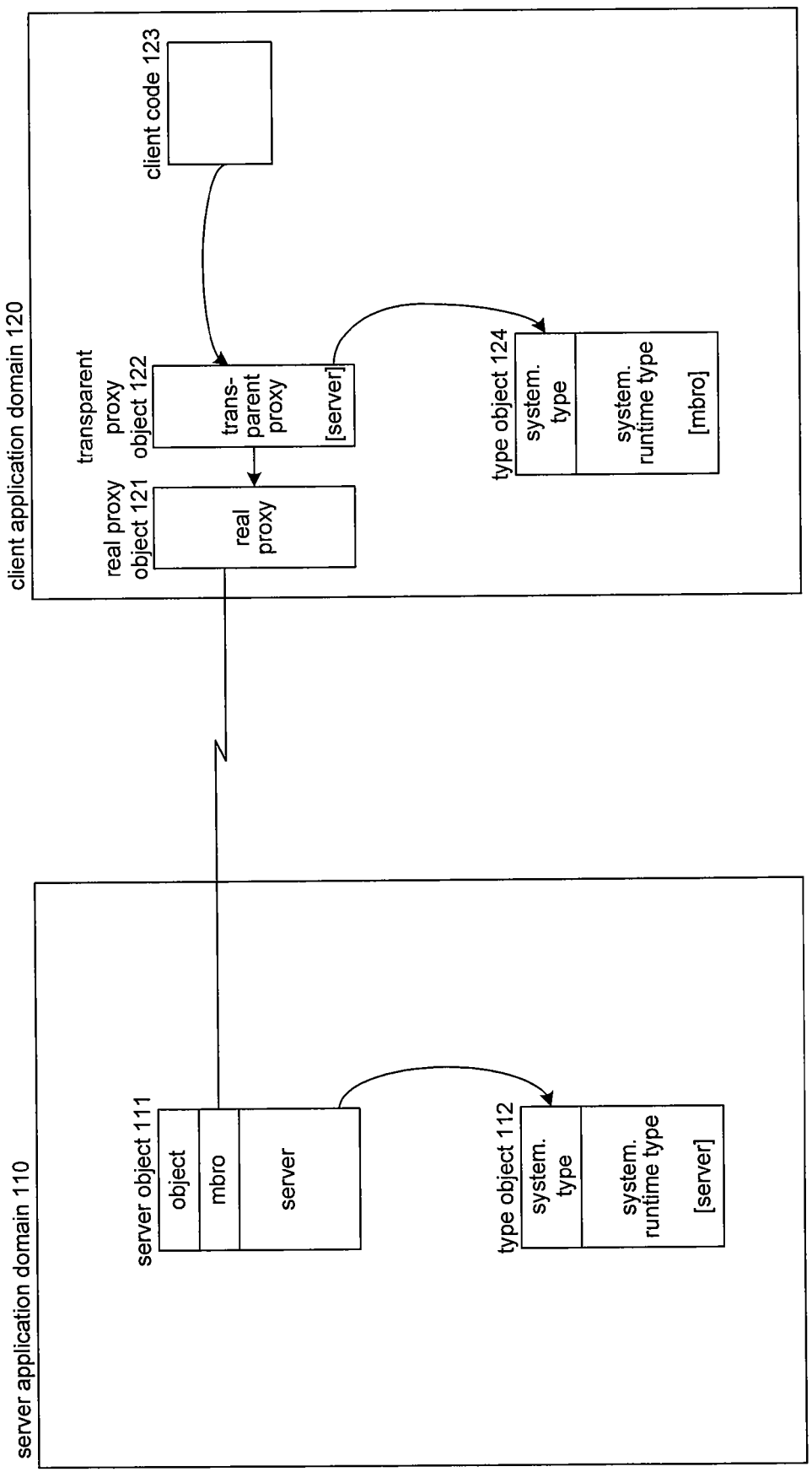
FIG. 1 is a block diagram that illustrates remote access of a server object by client code.
Figure 2:
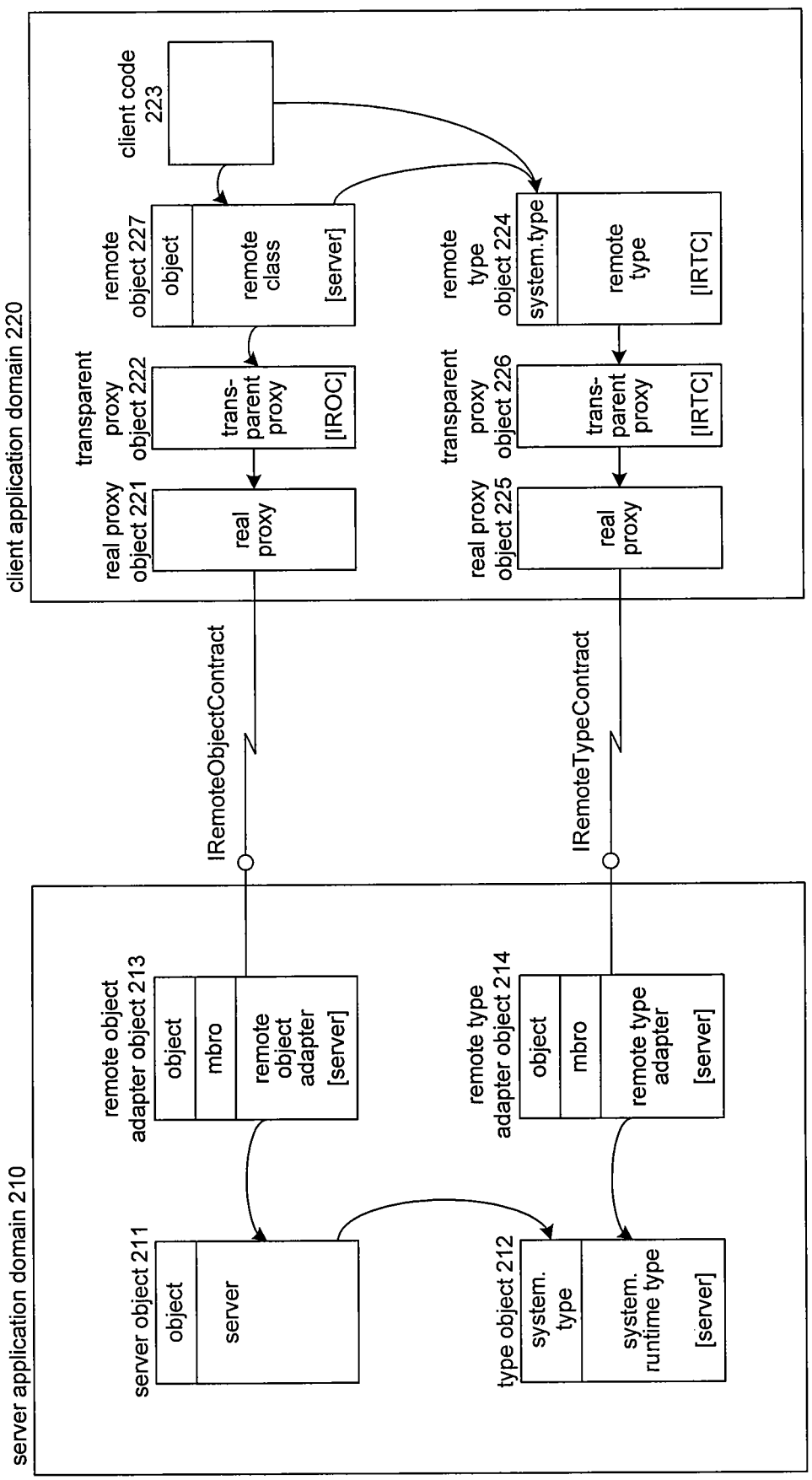
FIG. 2 is a block diagram that illustrates a solution that overcomes the problem of not having access to the type information of a server object.
Figure 4:
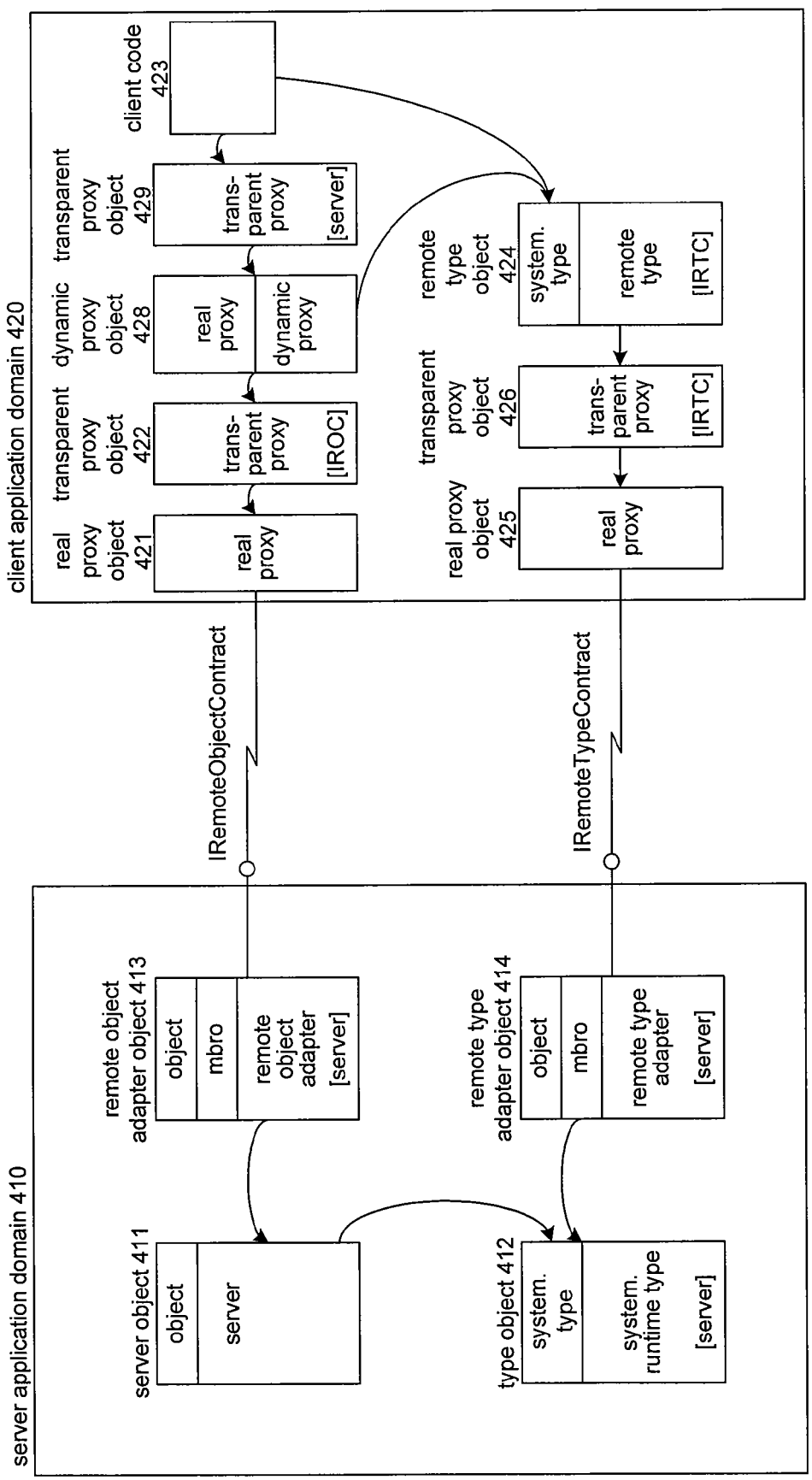
FIG. 4 is a block diagram that illustrates a solution to the problem of the remote object inheriting from the object class with a non-virtual get type method.

FIG. 4 is a block diagram that illustrates a solution to the problem of the remote object inheriting from the object class with a non-virtual get type method. The server application domain 410 includes a server object 411, a type object 412, a remote object adapter object 413, and a remote type adapter object 414. These objects correspond to the similarly named objects of FIG. 2. The client application domain 420 includes a real proxy object 421, a transparent proxy object 422, client code 423, a remote type object 424, a real proxy object 425, and a transparent proxy object 426. These objects correspond to the similarly named objects of FIG. 2. The remote object 227 of FIG. 2, however, has been replaced by a dynamic proxy object 428 and a transparent proxy object 429. The dynamic proxy object inherits the real proxy class. The transparent proxy object 429 looks to the client code as if it were an instance of the server object. The dynamic proxy object provides to the client code a reference to the transparent proxy object. When a method of the transparent proxy object 429 is invoked, the transparent proxy object 429 invokes the invoke method of the dynamic proxy object. Thus, when client code invokes the get type method of the transparent proxy object 429, the transparent proxy object 429 invokes the invoke method of the dynamic proxy object passing an indication that the get type method is to be invoked. The dynamic proxy class inherits the real proxy class, which specifies the invoke method as being virtual. Since the invoke method is virtual, the dynamic proxy object provides an overriding invoke method. When the overriding invoke method of the dynamic proxy object is invoked, it checks to see whether the get type method is being invoked. If so, the invoke method returns the type of the server object rather than the type of the object class. The dynamic proxy object can also provide the other functionality of the remote object 227 of FIG. 2.

The computing devices on which the late binding system may be implemented may include a central processing unit, memory, input devices (e.g., keyboard and pointing devices), output devices (e.g., display devices), and storage devices (e.g., disk drives). The memory and storage devices are computer-readable media that may be embedded with computer-executable instructions that implement the late binding system. In addition, the instructions, data structures, and message structures may be stored or transmitted via a data transmission medium, such as a signal on a communications link.

The late binding system may be used in conjunction with various computing systems or devices including personal computers, server computers, multiprocessor systems, microprocessor-based systems, network PCs, minicomputers, mainframe computers, distributed computing environments that include any of the above systems or devices, and the like. The late binding system may be used by various computing systems such as personal computers, cell phones, personal digital assistants, consumer electronics, home automation devices, and so on.

The late binding system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

I claim:

1. A method in a computing device for allowing client code executing in a client application domain to access a server object executing in a server application domain, the server object being an instance of a server class that inherits an object class with a non-virtual get type method, the method comprising:

instantiating a dynamic proxy object of a dynamic proxy class that inherits from a real proxy class, the real proxy class providing a virtual invoke method that is overridden by the dynamic proxy class;

instantiating a remote type object for providing type information relating to the object class and the server class of the server object;

under control of the dynamic proxy object, providing to client code a reference to a transparent proxy object that looks to the client code like an instance of the server class, the transparent proxy object having a get type method;

under control of the client code, invoking the get type method of the transparent proxy object;

under control of the get type method of the transparent proxy object, invoking the invoke method of the dynamic proxy object passing an indication that an implementation of the get type method is to be invoked;

and under control of the invoke method of the dynamic proxy object that overrides the invoke method of the real proxy class, when an indication that an implementation of the get type method is to be invoked is passed, returning to the transparent proxy object a reference for accessing the get type method of the server class of the remote type object, rather than returning a reference for accessing the non-virtual get type method of the object class that would be returned by the invoke method of the real proxy class.

2. The method of claim 1 including under control of the transparent proxy object, when the reference to the remote type object is returned from the dynamic proxy object, returning to the client code the reference to the remote type object.

3. The method of claim 2 including under control of the client code, when the reference to the remote type object is returned from the transparent proxy object, using the returned reference to access the remote type object.

4. The method of claim 1 wherein the dynamic proxy object communicates with the server object via a second transparent proxy object that communicates with a real proxy object.

5. The method of claim 1 wherein the remote type object communicates with a type object that executes in the server application domain and provides type information for the server object via a second transparent proxy object and a second real proxy object.

6. The method of claim 1 wherein the server application domain includes a type object for providing type information for the server object, a remote object adapter object, and a remote type adapter object, the remote object adapter object for providing client code with access to the server object, the remote type adapter object for providing client code with access to the type object.

7. The method of claim 1 wherein the server application domain and the client application domain execute within the .NET framework.

8. A computer-readable storage device encoded with instructions for controlling a computing device to allow client code within a client application domain to access a server object within a server application domain, the instructions comprising:

a remote type object for providing access to a type object corresponding to the server object, the server object being an instance of a server class that inherits an object class with a non-virtual get type method, the type object for providing information relating to the object class and the server class of the server object;

a dynamic proxy object of a dynamic proxy class that inherits from a real proxy class, the real proxy class providing a virtual invoke method that provides a reference to the get type method of the object class of the remote type object and that is overridden by the dynamic proxy class, the overriding invoke method for returning to a transparent proxy object a reference to the get type method of the server class of the remote type object when a get type method is to be invoked, wherein the transparent proxy object looks to the client code like an instance of the server class and provides a get type method;

and the transparent proxy object corresponding to the dynamic proxy object for:

receiving from the client code an invocation of the get type method, under control of the invoked get type method of the transparent proxy object, invoking the invoke method of the dynamic proxy object passing an indication of the get type method, and returning to the client code the reference to the get type method of the server class of the remote type object, rather than the non-virtual get type method of the object class of the remote type object.

9. The computer-readable storage device of claim 8 including client code that requests the dynamic proxy object for a reference to the transparent proxy object and invokes the get type method of the transparent proxy and receives the reference to the remote type object in return.

10. The computer-readable storage device of claim 8 wherein the type object corresponding to the server object is within the server application domain.

11. The computer-readable storage device of claim 10 wherein the server object has a corresponding remote object adapter object that instantiates a remote type adapter object, the remote object adapter object for providing client code with access to the server object, the remote type adapter object for providing client code with access to the type object.

12. The computer-readable storage device of claim 11 wherein the remote object adapter object and the remote type adapter object inherit a marshal by reference class.

13. The computer-readable storage device of claim 8 wherein the real proxy class and the transparent proxy class are provided by a remoting system.

14. The computer-readable storage device of claim 8 wherein the client application domain and the server application domain execute within the .NET framework.

15. The computer-readable storage device of claim 8 wherein the transparent proxy object invokes the invoke method via the dynamic proxy object cast to a real proxy object.

* * * * *